United States Patent [19]

Neefe

[11] Patent Number: 4,578,230

[45] Date of Patent: Mar. 25, 1986

[54] METHOD OF CONTOURING THE EDGE OF CONTACT LENSES

[76] Inventor: Charles W. Neefe, P.O. Box 429, Big Spring, Tex. 79720

[21] Appl. No.: 715,732

[22] Filed: Mar. 25, 1985

Related U.S. Application Data

[63] Continuation-in-part of Ser. No. 670,386, Nov. 9, 1984, abandoned, which is a continuation-in-part of Ser. No. 544,468, Oct. 24, 1983, abandoned, which is a continuation-in-part of Ser. No. 417,642, Sep. 13, 1982, Pat. No. 4,416,837.

[51] Int. Cl.$^4$ ............................................. B29D 11/00
[52] U.S. Cl. ................................... 264/2.1; 51/284 E; 264/2.5; 264/2.7; 425/808
[58] Field of Search ............ 264/1.4, 2.1, 2.6, 2.7, 264/139, 162, 310, 311, 2.5; 425/808; 51/284 E, 216 LP

[56] References Cited

U.S. PATENT DOCUMENTS

| | | | |
|---|---|---|---|
| 2,663,663 | 12/1953 | Weltman et al. | 264/139 |
| 2,990,664 | 7/1961 | Cepero | 51/284 |
| 3,430,391 | 3/1969 | Borish | 51/284 |
| 3,660,545 | 5/1972 | Wichterle | 264/2.1 |
| 4,155,962 | 5/1979 | Neefe | 264/2.5 |

*Primary Examiner*—James Lowe

[57] ABSTRACT

A method of rounding the edge of spin cast contact lenses by cutting a concave peripheral curve which intersects both the concave and convex lens surfaces and the lens mold. The lens material polishes away at a slower rate than the mold material providing an unevenness between the lens edge and the mold and provides a rounded contour on the lens edge.

18 Claims, 4 Drawing Figures

4,578,230

METHOD OF CONTOURING THE EDGE OF CONTACT LENSES

This is a continuation in part of application Ser. No. 670,386 entitled; "Method of Thinning the Edge of Contact Lenses" filed Nov. 09, 1984, now abandoned, which is a continuation in part of application Ser. No. 544,468 entitled; "An Improved Edge for Aspheric Contact Lenses" filed Oct. 24, 1983 now abandoned which is a continuation in part of Ser. No. 417,642 now U.S. Pat. No. 4,416,837 filed Sept. 13, 1982 entitled; "Simplified Improvements in Spin Casting".

PRIOR ART

The art of spin casting contact lenses has been in use for nineteen years.

Spin casting has proven to be the best process for economically producing large numbers of stock soft contact lenses. The spin cast process provides highly reproducible lenses having controlled parameters.

Spin casting provides a method of incorporating inert non-aqueous, water soluble solvents in the soft lens monomer mixture whereby the lens will shrink in size when hydrated and the solvent removed. This shrinkage is believed to enhance the coiling of the polymer chains and this accounts for the improved toughness, resilience and tear resistance of spin cast lenses. The process also lends itself to rapid ultra-violet curing which provides a predictable molecular structure with few toxic by-products.

The principal value of spin casting is its low cost and high production. Lenses made by spin casting also are most comfortable due to the thin and consistent edge shape provided by spin casting.

The disadvantages are the lenses are not spherical and the aspheric surface is of a shape that increases spherical aberration. This has three disadvantages: (1) The usable optical zone in the center of the lens is reduced requiring the lens to center well. (2) The reduction in visual acuity due to increased spherical aberration effect. (3) Visual acuity will fluxuate with lens movement.

A method has been developed whereby the advantages of spin casting may be employed to produce soft contact lenses having large optical zone with improved optical quality and reduced spherical aberration effect. This method requires a matching aspheric curve on the convex surface to neutralize the optical effects of the aspheric concave surface produced by spin casting.

Spin cast lenses made by this method will have thicker edges due to the peripheral flattening of the convex lens curve and are uncomfortable when placed on the eye.

Methods have been developed for reducing the excessive lens thickness at the edge. These procedures result in a thin edge which tapers to a zero or knife edge.

SUBJECT OF THE INVENTION

The present invention provides a method of contouring the extreme edge to round the edge and provide a smooth edge. The knife edge is very delicate and subject to tearing and flaking. The present invention provides a polished and contoured edge.

IN THE DRAWINGS

THE LENS IS MADE AS FOLLOWS

Figure 1:
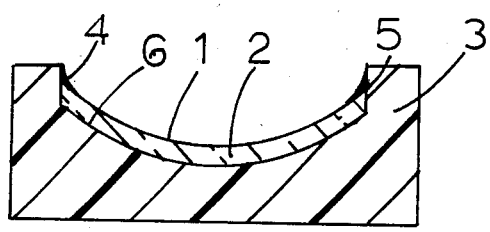
FIG. 1 shows the spin cast lens in the mold in section.

The lens in the spin cast mold, which for this description of the invention is a polymerized hard xerogel lens, is removed from the spin cast machine. The xerogel lens 2 FIG. 1 has a convex surface 6 FIG. 1 provided by the spin cast mold 3 FIG. 1. The concave surface 1 FIG. 1 is aspheric and due to surface tension has a meniscus edge curve 4 FIG. 1 which turns upward against the vertical edge 5 FIG. 1 of the concave lens mold. The vertical edge 5 FIG. 1 forms a cylinder around the mold cavity extending upward 0.02 millimeters to 1.5 millimeters above the concave optical surface 6 FIG. 1.

Figure 2:
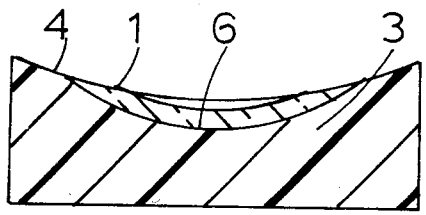
FIG. 2 shows the spin cast lens in the mold with the concave edge removed in section.

A longer radius curve 4 FIG. 2 is cut to the depth required to remove the vertical edge cylinder 5 FIG. 1 and the unwanted meniscus 4 FIG. 1. The radius of the cut 4 FIG. 1 must be longer than the radius of the lens surfaces 1 or 6 FIG. 2 and intersect radius 6 FIG. 2 at the junction of the optical surface and the edge cylinder 5 FIG. 1 surrounding it. The longer radius 4 FIG. 2 intersects both the concave lens surface 1 FIG. 2 and the convex lens surface 6 FIG. 2. The cut 4 FIG. 2 may be a segment of a sphere, a segment of a cone or a segment of a curve.

The surface 4 FIG. 2 is polished using a soft resilient polishing pad. Examples of the polishing pad material are velvet, velveteen, felt, leather, plastic foam, silicone rubber or cloth covering over a soft foam rubber. The curvature of the polishing surface is substantially the same as the curvature of the surface 4 FIG. 2. A polishing agent is suspended in a liquid medium. Examples of the polishing agent are metallic oxides, tin oxide, zinc oxide, aluminum oxide and iron oxide. The suspending liquid must be compatible with the xerogel. Examples are mineral oil, vegetable oil, glycerine and combinations of the above.

The hard xerogel lens material is capable of absorbing water and becoming a soft hydrogel contact lens. An example of a xerogel formulation is as follows:

Hydroxyethylmethacrylate: 95% by weight
methyl methacrylate: 2.5% by weight
ethylene dimethacrylate: 2% by weight
methyl ethyl Benzoin: 0.5% by weight The above formulation is placed in the spinning concave mold and exposed to ultraviolet light to polymerize the liquid monomer to form a hard xerogel lens.

Figure 3:
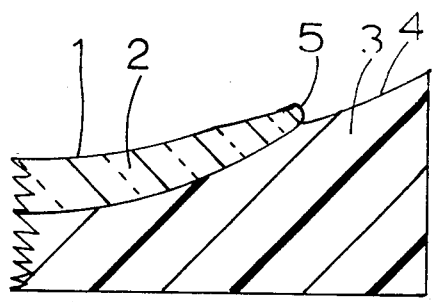
FIG. 3 shows the polished edge in the mold enlarged in section.
Figure 4:
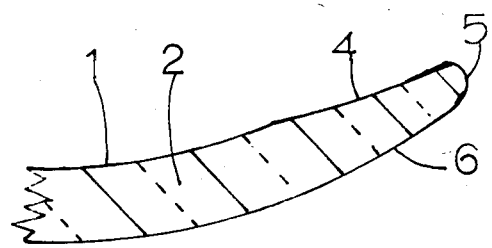
FIG. 4 shows the finished lens enlarged and in section.

The lens mold material is injection molded from a material softer than the lens material. Examples of the mold materials are nylon, polypropylene, acrylics and acrylonitrile. During the polishing of the surface 4 FIG. 2 the mold 3 FIG. 3 being softer than the lens will polish and be abraded away at a faster rate than the lens material 2 FIG. 3 resulting in an unevenness and the mold surface 4 FIG. 3 being below the lens surface 1 FIG. 3 exposing the lens edge. Further abrading of the exposed edge of the lens at the junction 5 FIG. 3 will develop a rounded edge contour. The lens is removed from the mold and the finished lens edge will have a convex surface 6 FIG. 2 which was molded against the spin cast mold. A concave surface 1 FIG. 4 which was spin cast. A peripheral curve 4 FIG. 4 produced by cutting and polishing and a rounded contoured edge provided by polishing while in the lens mold. The degree of rounding of the edge 5 FIG. 4 is dependent on the difference in polishing stock removal rate between the lens material 2 FIG. 3 and the mold material 3 FIG. 3 and the duration of the polishing operation. A longer polishing time provides more rounding of the exposed edge 5 FIG. 3. The finished lens is removed from the spin cast mold and hydrated to form a soft hydrogel contact lens.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above construction and methods without departing from the scope of the invention, it is intended that all matter contained in the above description shall be interpreted as illustrative and not in a limiting sense.

I claim:

1. A method of making spin cast contact lenses having a rounded edge by the steps of providing a concave casting mold made by injection molding using a material which is softer than the lens material to be cast in the concave mold, cutting a concave curve on the periphery of the lens having a radius longer than the radius present on the concave surface of the lens and said curve intersecting both surfaces of the lens and the concave lens mold, polishing the longer cut radius peripheral curve and allowing the softer mold material to be abraded and removed at a faster rate than the harder lens material, resulting in an unevenness at the junction of the lens and mold, thus exposing the lens edge, abrading and rounding the exposed edge of the lens.

2. A method of providing a rounded contour on the edge of a lens which has been spin cast in a mold made of a material which is a softer than the lens by abrading away the mold to expose the lens edge and continuing to abrade and round the lens edge, and then removing the lens from the mold.

3. A method of making a spin cast contact lens having a rounded edge by the steps of providing a concave spin casting concave casting mold made by injection molding using a material which is softer than the lens material to be cast in the concave mold, spin casting the lens material in the concave mold, cutting a concave curve on the periphery of the lens said curve intersecting both surfaces of the lens and the concave lens mold, the curve having a longer radius than that of either of the surfaces of the lens, abrading and polishing the longer radius peripheral curve and allowing the softer mold material to be abraded and removed at a faster rate than the harder lens material, exposing the lens edge, abrading and rounding the exposed edge of the lens, removing the lens from the concave spin casting mold.

4. A method as in claim 1 wherein the lens is a hard xerogel and is hydrated to form a soft hydrogel lens.

5. A method as in claim 2 wherein the lens is a hard xerogel and is hydrated to form a soft hydrogel lens.

6. A method as in claim 3 wherein the lens is a hard xerogel and is hydrated to form a soft hydrogel lens.

7. A method as in claim 1 wherein the peripheral curve is polished on a soft resilient polishing pad.

8. A method as in claim 2 wherein the peripheral curve is polished on a soft resilient polishing pad.

9. A method as in claim 3 wherein the peripheral curve is polished on a soft resilient polishing pad.

10. A method as in claim 1 wherein the polishing agent is suspended in a liquid medium.

11. A method as in claim 2 wherein the polishing agent is suspended in a liquid medium.

12. A method as in claim 3 wherein the polishing agent is suspended in a liquid medium.

13. A method as in claim 1 wherein the peripheral curve is a segment of a sphere.

14. A method as in claim 2 wherein the peripheral curve is a segment of a sphere.

15. A method as in claim 3 wherein the peripheral curve is a segment of a sphere.

16. A method as in claim 1 wherein the peripheral curve is a segment of a cone.

17. A method as in claim 2 wherein the peripheral curve is a segment of a cone.

18. A method as in claim 3 wherein the peripheral curve is a segment of a cone.

* * * * *